United States Patent [19]

Vanzegbroeck et al.

[11] Patent Number: 5,120,775
[45] Date of Patent: Jun. 9, 1992

[54] THIXOTROPIC ADDITIVE, PROCESS FOR PREPARING SAME AND USE THEREOF

[75] Inventors: Jan Vanzegbroeck, Duffel; Octavian Anton, Brussels, both of Belgium; Jürgen Ricking, Goch, Fed. Rep. of Germany

[73] Assignee: Redco, N.V., Kapelle-op-den-Bos, Belgium

[21] Appl. No.: 727,288

[22] Filed: Jul. 5, 1991

Related U.S. Application Data

[63] Continuation of Ser. No. 483,996, Feb. 22, 1990, abandoned, which is a continuation of Ser. No. 166,919, Mar. 11, 1988, abandoned.

[30] Foreign Application Priority Data

Mar. 13, 1987 [DE] Fed. Rep. of Germany ....... 3708084

[51] Int. Cl.$^5$ ........................ C01B 33/24; C08K 3/34
[52] U.S. Cl. ................................. 523/443; 423/331; 523/513; 524/789
[58] Field of Search ....................... 423/331; 23/293 R; 241/4, 30; 524/456, 789; 523/443, 513

[56] References Cited

U.S. PATENT DOCUMENTS

| | | | |
|---|---|---|---|
| 2,888,377 | 5/1959 | Allen | 423/331 |
| 3,806,585 | 4/1974 | Takahashi et al. | 423/331 |
| 4,298,386 | 11/1981 | Kubo et al. | 423/331 |
| 4,458,051 | 7/1984 | Munk | 524/779 |
| 4,490,492 | 12/1984 | Skudelny et al. | 523/443 |

FOREIGN PATENT DOCUMENTS 0038292 10/1981 European Pat. Off. .

*Primary Examiner*—Jeffrey E. Russel
*Attorney, Agent, or Firm*—Wegner, Cantor, Mueller & Player

[57] ABSTRACT

Disclosed are micronized synthetic calcium silicates in the form of fluffy particles of needle-like calcium silicate crystals having a particle size of about 0.5 to 50 microns and an average particle size $d_{50}$ of from 5 to 25 microns, and preferably of from 7 to 15 microns, obtainable from micronized, approximately spherical synthetic calcium silicate hydrate aggregates having a diameter of from 10 to 150 microns. They are preferably used in filled and unfilled liquid resin systems.

11 Claims, 1 Drawing Sheet

[1 cm = 5 μ]    X2000

[1 cm = 11μ]  X900

[1 cm = 5μ]  X2000

THIXOTROPIC ADDITIVE, PROCESS FOR PREPARING SAME AND USE THEREOF

This application is a continuation of U.S. Ser. No. 07/483,996, filed Feb. 22, 1990, now abandoned, which is a continuation of U.S. Ser. No. 07/166,919, filed Mar. 11, 1988, now abandoned.

The present invention relates to a thixotropic additive based on crystalline calcium silicates, a process for preparing same and the use thereof as a rheological and thixotropic additive in liquid resin systems.

Asbestos-based products are well known and still used as thixotropic and thickening products for liquid resin systems based on epoxy, polyester and polyurethane resins. Although the performance of these products is very satisfactory, the use and application of these fibrous materials have disadvantages. The main drawback is that the exposure to these materials can be detrimental to health.

For these reasons the use of these materials is no longer tolerated unless very stringent safety precautions are taken which for many companies has a very negative influence on the competitiveness of the product. Furthermore, applicators and users of resin systems very much prefer thixotropic additives which can be used and admixed on the site without having these potential health issues of the asbestos-based products.

There are other fibrous thickening and thixotropic agents, for example synthetic fibers made of polyethylene. These materials have the disadvantage that they can be used only up to a limited temperature. i.e. about 130° C. Furthermore, the average fiber length may be up to 200 microns or more, which gives a rough surface to the cured resin. For some applications there is even a requirement to use only inorganic thixotropic additives.

Furthermore it is also known that some organic rheological derivatives such as castor oil derivatives are widely used. These rheological additives have the disadvantage that, in order to be effective, they have to be processed within a specific temperature range above ambient temperature depending on the polarity of the solvent or resin used. It may also be required that they are pre-gellified in an organic solvent or plasticizer to obtain a paste. The temperature increase during processing must be obtained by a temperature-depending shear step, for example using a dissolver mixer. If the above conditions are not exactly fulfilled, these organic thixotropic additives will not be effective.

Thus, it can be seen that there is a need for an inorganic thixotropic which can be used without health risks, which can be readily processed at room temperature and by using simple mixing equipment and which has a high temperature resistance and a small particle size.

In the present invention there has been developed an inorganic rheological and thixotropic additive based on small special aggregates of calcium silicate crystals, which additive does not contain any asbestos and can be easily processed at ambient temperature using standard equipment. These calcium silicate particles have a particle size of from about 0.5 to 50 microns and an average particle size $d_{50}$ of from about 5 to 25 microns (measured by means of a laser beam as the diameter of spherical particles 50% of which each are larger or smaller than the measured value).

These particles of calcium silicate crystals are obtainable from approximately spherical interlocked crystal aggregates based on xonotlite, tobermorite or other synthetic calcium silicate hydrates and having a diameter of from more than 10 microns up to 150 microns.

Figure 1:
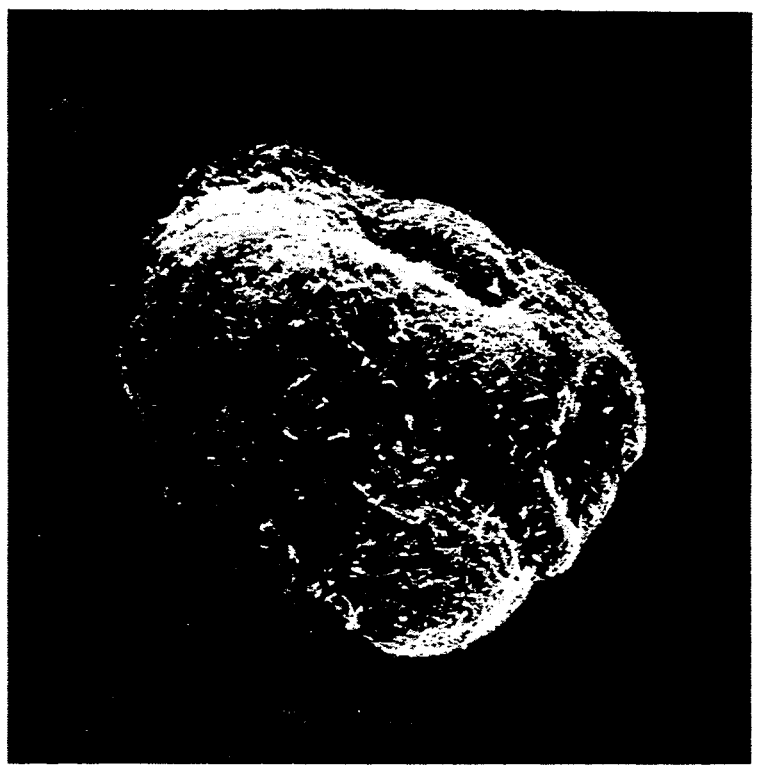
FIG. 1 shows an electronmicrograph of the xonotlite aggregate preferably serving as the starting material as described in Reference Example 1.

The preparation of the synthetic calcium silicate hydrates employed as the starting material has been described, for example, in the U.S. Pat. No. 3,501,324 and in the European Pat. No. 0 009 836. They are mainly used to make thermal insulating materials.

The synthesis is effected, for example, by a hydrothermal reaction of finely divided $SiO_2$, hydrated or quick lime and water at high temperature and with stirring, whereby different calcium silicate hydrates can be obtained, depending on the ratio of the starting materials and the hydrothermal conditions.

More particularly, as the starting material for the preparation of the calcium silicate particles of the invention there can be used approximately spherical xonotlite aggregates having the formula $Ca_6Si_6O_{17}(OH)_2$. These are marketed, for example, by the Company PROMAT, Ratingen, Federal Republic of Germany, under the trade name of Promaxon ®.

It is known that these approximately spherical aggregates exhibit a thickening effect in liquid resin systems such as epoxy, unsaturated polyester and polyurethane resins. This, more particularly, results in a higher viscosity. However, these spherical particles show nearly no thixotropic effect and, therefore, only a very small thixotropic index as measured, for example, by a rotation viscosimeter such as a Brookfield viscosimeter.

Moreover, the average particle size of the starting material is high, namely about 90 microns, which renders the product unsuitable for use in thin layer applications and coatings such as paints and lacquers, in airless-spray applications, sealants and other intended uses. Furthermore, this product shows a poor thixotropic stability upon curing of an epoxy resin, upon prolonged storage of the thixotropized resin or in curing at high temperatures. This results in a breakdown of structure viscosity and thixotropy, and the applied coatings or sealants or others sag down after application.

Hence, it is a further object of the present invention to provide a thixotropic additive which, if required, yields a stable thixotropy upon curing of the resin or on prolonged storage periods.

Smaller xonotlite aggregates are available in the market, such as "Xonotlite 20" or "Xonotlite 40" (Rheinische Kalksteinwerke—Wülfrath), which are based on lath-like crystal aggregates and offered in the form of a dried finely ground flour with particles having an average particle size of from 1 to 2 microns. A similar product is "Xonotlite VB 633" (Quarzwerke—Frechen). Although these particles have a small particle size, they have a bulk density of about 120 g/l to 250 g/l, probably due to their dense aggregate structure and grinding to a fine dust. The use thereof as a sedimentation inhibitor has been described in the EP-A-0 038 292.

Surprisingly, it has now been found that the object of the invention, to develop a thixotropic additive, can be attained by micronizing (controlled most finely powdering) the known, approximately spherical crystal aggregates of calcium silicate hydrate crystals having a particle size of more than 10 microns and up to 150 microns.

This micronizing can be done with an equipment such as a jet micronizer (Mikro Mall Technik), an air mill (Wedco), a spiral jet mill (Alpine), an energy mill (Sturtevant) and the like, where the micronizing process is accomplished by high velocity streams of compressed air, gas or steam, bringing the spherical xonotlite particles into rotation in the grinding chamber of the micronizer. Due to mutual collisions between the xonotlite particles, these spherical particles undergo controlled impact reduction in such a way that small open aggregates of crystal needles are formed.

After the impact reduction the fines, having a preselected size, move towards the collector part of the micronizer by centrifugal force. Thus, these jet mills also work as an air-classifier wherein the greater particles return to the periphery of the grinding chamber until the selected size has been obtained, whereafter the fines are collected.

Another method to prepare these fines is using a micronizer of the type using opposite jet airstreams and a fluidized bed (Alpine) in which the spherical xonotlite particles are transported into a fluidized bed stream where a size reduction occurs only by impact between the xonotlite particles.

The particles obtained by the process mentioned above are uniform from batch to batch. The fines obtained according to the present invention have a particle size of from 0.5 to 50 microns and an average particle size $d_{50}$ of from 5 microns to 25 microns, and preferably of between 7 and 15 microns.

Thus, the thixotropic additive consists of particles with a loose structure of calcium silicate crystals. Due to the micronizing process, the bulk density of the resulting powder decreases to about 40 g/l to about 90 g/l, compared to the bulk density of the starting material of about 70 g/l to about 130 g/l.

The calcium silicate particles consisting of intergrown flocculent particles of needle-like crystals and obtained according to the present invention are particularly well suited as a thickening and thixotropic additive in liquid resin systems, including pure as well as filled resin systems.

Depending on the intended use and on the desired physical and rheological properties, such a mixture contains about 0.1 to about 30% by weight of the thixotropic additive. Preferred compositions can be easily determined by routine experiments by anyone skilled in the art.

Thus, preferably such a mixture contains from about 5 to 99.9% by weight of the liquid components, from about 95 to 0% by weight of the fillers and from about 0.1 to 30% by weight of the thixotropic additive of the present invention.

The liquid component preferably consists of an organic polymerizable resin, liquid reaction components of such a resin or other liquid additives. These include epoxy resins such as reaction products of epichlorohydrin and bisphenol A and the like, modified epoxy resins or combinations with phenolic or formaldehyde resins; tar-epoxy combinations; hardeners for epoxy resins such as acids or alkaline compounds, for example amines or amides and their derivatives; $BF_3$ and its complexes with organic compounds, acids and their anhydrides and other combinations which are well known by those working in the field; unsaturated polyesterprepolymers, unsaturated monomers and a source of free radicals; polyurethanes and their proper hardener systems; alkyd and oil-based alkyd resins; unsaturated polyimides, polysilicones, methacrylate and acrylate resins, phenolic resins such as phenol-formaldehyde or alkyl derivatives and the like; melamine-formaldehyde resins, vinyl polymers and copolymers such as PVC and the like and plasticizers such as dioctylphthalate, benzyloctylphthalate and others; bitumen-based products, polysulfides, acryl-, butyl-, isobutyl- and chlorobutyl-based sealing or caoutchouc materials, latex-based paints, and blends or alloys prepared by mixing together two or more polymers or resins by mechanical means.

As liquid resin-additives there may be used reaction accelerators, initiators, catalysts, diluents, UV-stabilizers, plasticizers, antioxidants, flame retardants, air-release additives and others.

In filled resin systems there may be employed well known filler materials such as amorphous silica or crystalline quartz, sulfates, carbonates, silicates, clays, oxides, carbon and others.

Regarding the above enumeration it is understood that other examples will occur to an artisan and, thus, the lists serve as examples but are not to be considered as limitations.

Additionally, it has surprisingly been found in the present invention that upon micronizing approximately spherical synthetic calcium silicate particles, which have been made hydrophobic by treatment with organosilicon compounds, there are obtained hydrophobic small-sized calcium silicate aggregates achieving an improved thickening and thixotropic effect superior to that of the hydrophobic spherical starting particles and which, in addition, give also a stable thixotropy and structure viscosity during the hardening process of cross-linkable more polar resins, for example of epoxides. Furthermore, this hydrophobic micronized synthetic calcium silicate provides a better thickening effect than the untreated micronized calcium silicates of the present invention, more specifically in medium-polar to polar resin systems like epoxy, polyester or polyurethane systems. In non-polar or low-polar systems the untreated micronized calcium silicate gives a better thickening and thixotropic effect than the hydrophobic one.

The use of the hydrophobic version has the advantage that, where it is necessary, the user can work with a system which has a more constant rheological and thixotropic behavior until the hardening process has sufficiently progressed.

The hydrophobic, approximately spherical aggregates of the synthetic calcium silicate, preferably based on xonotlite, are obtained by a treatment of the calcium silicate with a modified organosilicone compound, and preferably a hydroxyl-organofunctional polysiloxane which can react with the surface groups of the xonotlite crystals. The polysilicone may be added as an aqueous dispersion to the xonotlite slurry which is subsequently dried, or it may be added to the dry powder by means of conventional coating technique as known to the artisan. The amount varies between about 3% up to 10% by weight, and preferably between about 4 and 7% by weight. Basically it is also possible to effect the hydrophobization even after the micronizing step.

This type of hydrophobic small-size calcium silicate particles described in the present invention can be used in liquid resin systems with or without filler materials as described in the list above, which is not intended to be limiting but is presented for illustration only.

Preferred compositions can be readily determined by routine experiments by anyone skilled in the art.

For this part of the invention the resin mixture preferably contains from about 5 to 99.9% by weight of the liquid components, resin, reaction components or additives, from about 95 to 0% by weight of the fillers and from about 0.1 to 30% by weight of the hydrophobic synthetic calcium silicate hydrate according to the present invention.

The invention is further illustrated by, but not limited to, the following examples. In the examples, unless otherwise specified, the amount of calcium silicate added is given in parts per 100 parts of complete resin formulation, excluding said calcium silicate.

REFERENCE EXAMPLE 1

The example illustrates the preparation of approximately spherical xonotlite aggregates which are subsequently micronized to produce the material of the present invention.

Quick lime or hydrated lime having a calcium oxide content of 95% and crystalline silicon dioxide having a purity of 95% of $SiO_2$ are mixed in water in a molar ratio of from 0.94 to 1 to prepare a suspension having a water to solids ratio of 11:1. The suspension is stirred in an autoclave at a temperature of about 190° C. Xonotlite crystals are obtained as a suspension after 8 hours. This suspension is partially freed from water by filtration and then dried in a flash drier. The product obtained has the following properties:

Morphology: Spherical particles comprising three-dimensionally randomly interlocked primary crystals, bound together by hydrothermal crystal growth process:

Diameter: 10 to 150 microns $d_{50}$: 50 microns (the $d_{50}$ value is determined by means of a laser beam as the diameter of spherical particles, 50% of which each are larger or smaller than the measured value)

Apparent particle volume: 5.6 cm$^3$/g

Specific surface area (BET): 60 m$^2$/g

Surface structure: statistic net work of fine interlocked crystals.

A typical particle is shown in the photograph of the attached FIG. 1.

REFERENCE EXAMPLE 2

Preparation of hydrophobic, approximately spherical xonotlite particles:

The xonotlite particles obtained in Reference Example 1 are coated with an aqueous non-ionic dispersion of 60% by weight of a hydroxyl-functional polysiloxane. The polysilicone dispersion is sprayed at a level of 8.5% w/w on the xonotlite powder which is heated up to 120° C. The coated xonotlite is then further heated to 150–160° C. for 15 minutes and then cooled down.

EXAMPLE 1

Preparation of micronized calcium silicate particles:

Dry xonotlite powder, prepared according to reference example 1 is injected under pressure into a jet micronizer with a constant feeding rate of 150 g/min. The jet micronizer has a diameter of 200 mm and works at a pressure of 7 bars at 20° C. The resulting product has the following characteristics:

Particle size: 2 microns to 50 microns $d_{50}$: 12 microns (the $d_{50}$ value is determined by means or a laser beam as the diameter of spherical particles, 50% of which each are larger or smaller than the measured value)

Apparent density: 55 g/l

Morphology: Loose aggregate structure of three-dimensionally interlocked primary calcium silicate crystals.

Figure 2:
FIG. 2 shows an electronmicrograph of the material of the present invention as described in Example 1.

A typical example of the micronized calcium silicate particles is shown in the photograph of the attached FIG. 2.

EXAMPLE 2

Preparation of micronized hydrophobic calcium silicate particles:

Dry hydrophobic xonotlite powder prepared according to Reference Example 2 is micronized under the same conditions as described in Example 1. A product having the following characteristics is obtained:

Particle size: 1 micron to 50 microns $d_{50}$: 9 microns

Apparent density: 80 g/l

EXAMPLE 3

Comparison of the thickening and thixotropic effect of the micronized calcium silicate of the present invention with the starting material (Reference Example 1) and other xonotlite powders:

6 Parts by weight of the xonotlite powder are intensively mixed using a stirrer with 100 parts by weight of a pure low-viscosity (1 000 mPa.s) epoxy resin on Bisphenol A basis. Then the viscosity of the mixture is measured with a Brookfield rotation viscosimeter, and the shear thinning or thixotropy index is calculated as the ratio of the Brookfield viscosities at rotation speeds of 1 and 10 min$^{-1}$. The results are set forth hereinbelow.

| Additive: | Viscosity (mPa.s) | Thixotropy Index |
|---|---|---|
| Micronized xonotlite (EXAMPLE 1) | 70 000 | 4.50 |
| Spherical xonotlite particles (Reference Example 1) | 7 000 | 1.35 |
| Xonotlite 20 (Wulfrath) | 5 400 | 1.75 |
| Xonotlite VP 633 (Quarzwerke) | 4 000 | 1.35 |

EXAMPLE 4

A reaction-hardening two-component-epoxy resin coating containing about 50% of filler materials is thixotropized with the same xonotlite powders as described in Example 3.

80 Parts by weight of the epoxy component are mixed using a stirrer with 20 parts by weight of the hardener component. To this mixture the xonotlite powder is added in such an amount that a coating of 1 mm thickness can be applied at ambient temperature with no sagging down. The following amounts of xonotlite powder were required to establish the non-sag condition.

| Additive: | Parts/100 Parts of Resin Mixture |
|---|---|
| Micronized xonotlite (EXAMPLE 1) | 3.15 |
| Spherical xonotlite particles | 4.50 |

| Additive: | Parts/100 Parts of Resin Mixture |
|---|---|
| (Reference Example 1) | |
| Xonotlite 20 (Wulfrath) | 7.40 |
| Xonotlite VP 633 (Quarzwerke) | 11.00 |

EXAMPLE 5

To a pure polydimethylsiloxane fluid having a viscosity of $10^{-1} m^2/s$ (1 000 cSt) there are added with stirring and intensive mixing varied amounts of the micronized xonotlite (Example 1) and of the spherical xonotlite (Reference Example 1). Then the viscosity is measured using a Brookfield viscosimeter, and the thixotropy index is calculated from the viscosities measured at rotation speeds at of 1 and 10 $min^{-1}$. The following results are obtained:

| Parts/100 Parts | Brookfield-Viscosity 1 $min^{-1}$ (mPa.s) | | Thixotropy Index | |
|---|---|---|---|---|
| | micronized | spherical | micronized | spherical |
| 2 | 11 000 | 2 000 | 2.75 | 1.30 |
| 4 | 29 000 | 2 500 | 4.15 | 1.30 |
| 6 | 60 000 | 4 000 | 5.00 | 1.40 |
| 8 | 85 000 | 11 000 | 5.60 | 2.25 |

EXAMPLE 6

Thixotropized mixture of a two-component polyurethane for floorings, based on branched polyols and aromatic polyisocyanates:

83 Parts by weight of component A containing 50% of filler materials are mixed using a simple paint stirrer with 17 parts of the component B. To this mixture the hydrophobic xonotlite-based thixotrope is added in such an amount that a coating of 1 mm in thickness can be applied and cured in a vertical position at ambient temperature without sagging down. The following results are obtained:

| Additive: | Parts/100 Parts of Resin Mixture |
|---|---|
| Micronized hydrophobic xonotlite (EXAMPLE 2) | 4.0 |
| Hydrophobic spherical xonotlite (Reference Example 2) | 6.0 |
| Xonotlite 40 (Wulfrath) | 14.0 |

EXAMPLE 7

To a highly reactive low-viscosity unsaturated polyester resin with a styrene content of 37% w/w and based on ortho-phthalic acid and standard glycols and having a viscosity of 245 mPa.s at 23° C. there are added varied amounts of the hydrophobic xonotlite-based thixotropes are added. Then the viscosity and the thixotropy index were determined. The results are as follows:

| Additive: | Parts | | | |
|---|---|---|---|---|
| | 2 | 4 | 6 | 8 |
| Brookfield Viscosity (mPa.s) | | | | |
| Micronized hydrophobic xonotlite (EXAMPLE 2) | 2 000 | 11 000 | 30 000 | 65 000 |
| Hydrophobic spherical xonotlite (Reference Example 2) | 1 600 | 2 000 | 3 000 | 9 000 |
| Xonotlite 40 (Wulfrath) | — | — | 1 000 | 1 400 |
| Thixotropy Index (1/10 $min^{-1}$) | | | | |
| Micronized hydrophobic xonotlite (EXAMPLE 2) | 1.80 | 3.65 | 4.60 | 5.42 |
| Hydrophobic spherical xonotlite (Reference Example 2) | 1.75 | 2.00 | 2.40 | 2.80 |
| Xonotlite 40 (Wulfrath) | — | 1.60 | 1.60 | 1.70 |

EXAMPLE 8

Thixotropized two-component system showing a stable structure viscosity and thixotropy upon curing.

To the same epoxy resin system as described in Example 4 the hydrophobic xonotlite powders described in Example 2 und Reference Example 2 are admixed in such amounts that a coating of 1 mm in thickness can be cured at ambient temperature in a vertical position without sagging down. For the micronized hydrophobic xonotlite, 2.75 parts are needed per 100 parts of resin to meet the non-sag condition. For the hydrophobic spherical xonotlite there are needed 4.20 parts or 53% more.

In a second part of the test the thixotropic epoxy mixtures as described above are stored at room temperature until the end of the potlife, about 40 minutes. After this period a coating of 1 mm in thickness was applied and cured under the same conditions as above. In the case of the hydrophobic calcium calcium silicate no sagging occurs, as well as upon application immediately after the calcium silicate has been mixed in. When the same experiment is carried out with the untreated micronized or spherical xonotlite, i.e. upon storing the thixotropized resin until the end of the potlife and only then applying a 1 mm coating, it is observed that this coating strongly sags down already a few minutes after the application, although the amount of xonotlite added is initially enough to apply a non-sagging coating immediately after the preparation of the thixotropized resin mixture.

EXAMPLE 9

A two-component epoxy resin mixture was thixotropized with the hydrophobic micronized xonotlite of Example 2. Then the thixotropy index of the resin mixture was measured with a Brookfield viscosimeter during the curing reaction at ambient temperature until the end of the potlife (45 minutes).

80 Parts by weight of the epoxy component were mixed with 20 parts by weight of the hardener component. To this mixture, 4.25 parts by weight of the hydrophobized micronized calcium silicate (Example 2) were added and intensively mixed in. The following results were obtained:

| Curing Time (min) | 5' | 10' | 20' | 30' | 40' | 45' |
|---|---|---|---|---|---|---|
| Thixotropy Index | 5.45 | 5.65 | 5.99 | 6.12 | 5.20 | 4.90 |

| Curing Time (min) | 5' | 10' | 20' | 30' | 40' | 45' |
|---|---|---|---|---|---|---|
| (1/10 min$^{-1}$) | | | | | | |

These measurements show that at the end of the potlife the thixotropy index decreases only very slowly (−10%) compared to the starting mixture. For the Brookfield viscosity at 1 min$^{-1}$ there was found after 5 minutes curing 270 Pa.s and after 45 minutes curing 225 Pa.s or only a slight decrease of 18%.

An experiment equivalent to that set forth above was carried out using untreated calcium silicate. To the same epoxy resin mixture as above, 3.5 parts by weight of the micronized xonotlite (Example 1) were added and intensively mixed in, whereafter the viscosity and thixotropy index were measured during the curing reaction at ambient temperature with a Brookfield viscosimeter. The following results were obtained:

| Curing Time (min) | 5' | 10' | 20' | 30' | 40' | 45' |
|---|---|---|---|---|---|---|
| Thixotropy Index (1/10 min$^{-1}$) | 3.25 | 3.46 | 3.75 | 3.33 | 2.53 | 1.90 |

The results show a strong decrease of the thixotropy of about 40% as the thixotropy index as compared to the initial value. For the Brookfield viscosity at 1 min$^{-1}$ there was found after 5 minutes curing 80 Pa.s and after 45 minutes curing 36 Pa.s or a strong decrease of 55%.

EXAMPLE 10

A highly filled epoxy mortar composition contains, by weight,
- 80 parts of a low-viscosity modified epoxy resin having a viscosity of about 3000 mPa.s,
- 48 parts of a modified cycloaliphatic polyamine,
- 75 parts of quartz flour,
- 130 parts of quartz sand of from 0.1 to 0.3 mm and
- 160 parts of quartz sand of from 0.6 to 1 mm.

For the above mortar composition the amount of micronized calcium silicates of the present invention was determined which are needed to apply a layer of the epoxy mortar of 1 cm in thickness without sagging down. Of the micronized xonotlite of Example 1, 3 parts are needed, based on the total formulation, whereas 2 parts of the micronized hydrophobic xonotlite of Example 2 are needed to attain the non-sag condition.

Thereafter, mixtures were made consisting of the epoxy component, the quartz filler and the above-mentioned amounts of the thixotropic calcium silicate. These mixtures were stored at ambient temperature. After regular periods the epoxy component was mixed with the hardener component, and the mixture was cured as a mortar layer of 1 cm thickness.

In the case of the micronized of the hydrophobic xonotlite of Example 2 the initial thixotropy is retained, and the epoxy mortar is non-sagging, whereas the mixture containing the untreated micronized xonotlite of Example 1 is running down already after 1 day of storage. This demonstrates the positive effect of the hydrophobic coating of the calcium silicate on the stock stability of the thixotropized resin.

We claim:

1. A method of providing thixotropy to a liquid resin comprising adding to the liquid resin 0.1 to 30% by weight of a thixotropic additive comprising calcium silicate crystals having a particle size of about 0.5 to 50 microns, an average particle size d$_{50}$ of about 5 to 25 microns, and a bulk density of about 40 to 90 g/l that is obtained by micronizing approximately spherical synthetic calcium silicate hydrate aggregates comprising three-dimensionally randomly interlocked primary crystals with a surface structure of a network of interlocked crystals and having a diameter of 10 to 150 microns and a bulk density of about 70 to 130 g/l, thereby providing a thixotropic liquid resin.

2. The method according to claim 1 wherein the average particle size d$_{50}$ is 7 to 15 microns.

3. The method according to claim 1 wherein the synthetic calcium silicate hydrate aggregates are xonotlite crystals having the formula Ca$_6$Si$_6$O$_{17}$(OH)$_2$.

4. The method according to claim 1 wherein the synthetic calcium silicate hydrate aggregates are hydrophobized calcium silicate crystals.

5. The method according to claim 4 wherein the hydrophobized calcium silicate crystals are prepared from xonotlite crystals having the formula Ca$_6$Si$_6$O$_{17}$(OH)$_2$.

6. The method of claim 1 wherein the resin is an epoxy resin, a polyurethane resin, a polyester resin, or a mixture thereof.

7. A method of providing thixotropy to a liquid resin comprising:
   micronizing approximately spherical synthetic calcium silicate hydrate aggregates comprising three-dimensionally randomly interlocked primary crystals with a surface structure of a network of interlocked crystals and having a diameter of about 10 to 150 microns and a bulk density of about 70 to 130 g/l to give a thixotropic additive comprising particles of calcium silicate crystals having a particle size of about 0.5 to 50 microns, an average particle size d$_{50}$ of from 50 to 25 microns, and a bulk density of about 50 to 90 g/l; and
   adding said thixotropic additive in an amount of 0.1 to 30% by weight to a liquid resin.

8. The method of claim 7 wherein the average particle size d$_{50}$ is 7 to 15 microns.

9. The method according to claim 7 wherein the calcium silicate hydrate aggregates are xonotlites crystals having the formula Ca$_6$Si$_6$O$_{17}$(OH)$_2$.

10. The method according to claim 7 wherein the spherical synthetic calcium silicate hydrate aggregates are treated with a hydrophobizing agent before micronizing.

11. The method of claim 7 wherein the resin is an epoxy resin, a polyurethane resin, a polyester resin, or a mixture thereof.

* * * * *